(12) United States Patent
Tanaka et al.

(10) Patent No.: US 11,438,400 B2
(45) Date of Patent: Sep. 6, 2022

(54) CONTENT DATA DELIVERY SYSTEM, SERVER, AND CONTENT DATA DELIVERY METHOD

(71) Applicant: Yamaha Corporation, Hamamatsu (JP)

(72) Inventors: Katsuaki Tanaka, Hamamatsu (JP); Osamu Kohara, Hamamatsu (JP); Masafumi Toshitani, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 284 days.

(21) Appl. No.: 15/897,464

(22) Filed: Feb. 15, 2018

(65) Prior Publication Data

US 2018/0176337 A1  Jun. 21, 2018

Related U.S. Application Data

(63) Continuation of application No. PCT/JP2016/073062, filed on Aug. 5, 2016.

(30) Foreign Application Priority Data

Aug. 19, 2015 (JP) .............................. JP2015-161519

(51) Int. Cl.
*H04L 67/01* (2022.01)
*H04N 21/436* (2011.01)
(Continued)

(52) U.S. Cl.
CPC .............. *H04L 67/01* (2022.05); *G06F 13/00* (2013.01); *G10K 15/02* (2013.01); *H04L 7/04* (2013.01);
(Continued)

(58) Field of Classification Search
CPC . H04L 67/42; H04L 7/04; H04L 43/08; G06F 13/00; G10K 15/02; H04N 21/43; H04N 21/436
See application file for complete search history.

(56) References Cited

U.S. PATENT DOCUMENTS 7,324,857 B2 * 1/2008 Goddard ............. H04L 12/2803
                                                    700/94
9,210,058 B2 * 12/2015 Kjeldaas ............. H04L 65/1083
(Continued)

FOREIGN PATENT DOCUMENTS

JP          8-316944 A     11/1996
JP     2005-323268 A       11/2005
(Continued)

OTHER PUBLICATIONS

Extended European Search Report issued in counterpart European Application No. 16837006.2 dated Dec. 4, 2018 (13 pages).
(Continued)

*Primary Examiner* — Thu V Nguyen
*Assistant Examiner* — Robert B McAdams
(74) *Attorney, Agent, or Firm* — Crowell & Moring LLP

(57) ABSTRACT

A content data delivery system includes a server and a client. The server includes at least one processor configured to implement stored instructions and execute a plurality of tasks. The plurality of tasks include a server side communication task that transmits and receives test data including time information to and from the client, a calculating task that obtains a reference time difference with the client based on the time information of the test data that has been transmitted and received by the server side communication task, and a delivering task that delivers content data including information that indicates reproduction timing to the client. The server or the client includes a correcting task that corrects the reproduction timing of the content data by use of the reference time difference.

16 Claims, 13 Drawing Sheets

(51) Int. Cl.
  *G10K 15/02* (2006.01)
  *G06F 13/00* (2006.01)
  *H04N 21/43* (2011.01)
  *H04L 7/04* (2006.01)
  *H04L 43/08* (2022.01)

(52) U.S. Cl.
  CPC ............ *H04L 43/08* (2013.01); *H04N 21/43* (2013.01); *H04N 21/436* (2013.01)

(56) References Cited

U.S. PATENT DOCUMENTS

| | | | |
|---|---|---|---|
| 9,838,584 B2 * | 12/2017 | Kumar | H04N 5/2257 |
| 2003/0198255 A1 * | 10/2003 | Sullivan | H04H 20/18 |
| | | | 370/503 |
| 2007/0250761 A1 * | 10/2007 | Bradley | H04L 29/06027 |
| | | | 715/203 |
| 2015/0281028 A1 * | 10/2015 | Akhter | H04L 43/0858 |
| | | | 370/252 |
| 2016/0105473 A1 * | 4/2016 | Klingbeil | H04L 47/2416 |
| | | | 370/260 |

FOREIGN PATENT DOCUMENTS

| | | |
|---|---|---|
| JP | 2006-195838 A | 7/2006 |
| JP | 2011-223060 A | 11/2011 |
| JP | 5436311 B2 | 3/2014 |
| WO | WO 2007/086564 A1 | 8/2007 |

OTHER PUBLICATIONS

Japanese-language Office Action issued in counterpart Japanese Application No. 2015-161519 dated Feb. 26, 2019 with English translation (seven (7) pages).

International Search Report (PCT/ISA/210) issued in PCT Application No. PCT/JP2016/073062 dated Oct. 25, 2016 with English translation (four pages).

Japanese-language Written Opinion (PCT/ISA/237) issued in PCT Application No. PCT/JP2016/073062 dated Oct. 25, 2016 (four pages).

European Office Action issued in European Application No. 16837006.2 dated Mar. 27, 2020 (five (5) pages).

* cited by examiner

Fig.5

| HEADER | Command | Sequence | Clock | Re_trans_id |
|---|---|---|---|---|
| BODY | AUDIO DATA ||||

CONTENT DATA DELIVERY SYSTEM, SERVER, AND CONTENT DATA DELIVERY METHOD

CROSS REFERENCE TO RELATED APPLICATIONS

The present application is a continuation application of International Patent Application No. PCT/JP2016/073062, filed on Aug. 5, 2016, which claims priority to Japanese Patent Application No. 2015-161519, filed on Aug. 19, 2015. The contents of these applications are incorporated herein by reference in their entirety.

BACKGROUND OF THE INVENTION

1. Field of the Invention

A preferred embodiment of the present invention relates to a content data delivery system, a server, and a content data delivery method that deliver content data from a server to a client.

2. Description of the Related Art

Conventionally, a content reproduction system that streams content data from a server to a plurality of clients and reproduces the content data at each client has been known (see Japanese Unexamined Patent Application Publication No. 2006-195838, for example).

A delivery system of Japanese Unexamined Patent Application Publication No. 2006-195838 streams, as content data, compressed audio data such as MP3 from a server to each client. As a result, a user can listen to the audio data stored in a storage of a server, in every room of a house.

However, in the content data delivery system of Japanese Unexamined Patent Application Publication No. 2006-195838, since the reproduction timing of each device is not taken into consideration, out-of-sync sound between devices causes a problem.

In addition, if information that indicates reproduction timing is delivered to each client and even if each client reproduces content data based on the information that indicates reproduction timing, each device has a different absolute value of a clock and a different rate of advance of a clock. Therefore, if each device continues reproduction for a long time, the out-of-sync sound between devices causes a problem.

SUMMARY OF THE INVENTION

In view of the foregoing, an object of a preferred embodiment of the present invention is to provide a content data delivery system, a server, and a content data delivery method that are able to synchronize reproduction between devices even when the clock is out of sync between devices.

A content data delivery system includes a server and a client. The server includes at least one processor configured to implement stored instructions and execute a plurality of tasks. The plurality of tasks include a server side communication task that transmits and receives test data including time information to and from the client, a calculating task that obtains a reference time difference with the client based on the time information of the test data that has been transmitted and received by the server side communication task, and a delivering task that delivers content data including information that indicates reproduction timing to the client. The server or the client includes a correcting task that corrects the reproduction timing of the content data by use of the reference time difference.

According to a preferred embodiment of the present invention, even when a clock is out of sync between devices, reproduction between the devices is able to be synchronized.

The above and other elements, features, characteristics, and advantages of the present invention will become more apparent from the following detailed description of the preferred embodiments with reference to the attached drawings.

BRIEF DESCRIPTION OF THE DRAWINGS

FIG. 5 illustrates a structure of packet data.

DETAILED DESCRIPTION OF THE PREFERRED EMBODIMENTS

A content data delivery system according to a preferred embodiment of the present invention includes a server and a client. The server includes a server side communication portion that transmits and receives test data including time information to and from the client; a calculating portion that obtains a reference time difference with the client being information for correcting reproduction timing of content data, based on time information of the test data that has been transmitted and received by the server side communication portion; and a delivering portion that delivers the content data including information that indicates the reproduction timing to the client. The server or the client includes a correcting portion that corrects the reproduction timing of the content data by use of the reference time difference.

Specifically, test data that the server transmits includes transmission time information, and return test data that each client transmits includes reception time information of the test data and transmission time information of the return test data. The calculating portion calculates an arithmetic average of transmission time of the test data and reception time of the return test data, and an arithmetic average of reception time of the test data in each client and transmission time of the return test data, and calculates a difference between the arithmetic average of the server and the arithmetic average of each client as the reference time difference.

In this manner, the server calculates the reference time difference (the clock difference between the server and the client) by transmitting and receiving the test data including time information between the server and the client. The calculated reference time difference is used for correction of the reproduction timing of content data.

It is to be noted that the reference time difference is a reference time difference obtained by being delivered to each client and received in each client, and may correct the reproduction timing of content data or may correct the reproduction timing of content data to be delivered to each client on the server side.

It is to be noted that transmission and reception of data including time information may be executed a plurality of times and it is preferable for the calculation of the reference time difference to use a value with the smallest difference in time from when the server transmits test data to when return data to the test data is received.

In addition, the transmission and reception of the test data and calculation of the reference time difference may be performed before the delivery of content data or may be performed during the delivery of content data. In a case of performing during the delivery, the calculating portion obtains a reference time difference by use of the latest test data.

Figure 1:
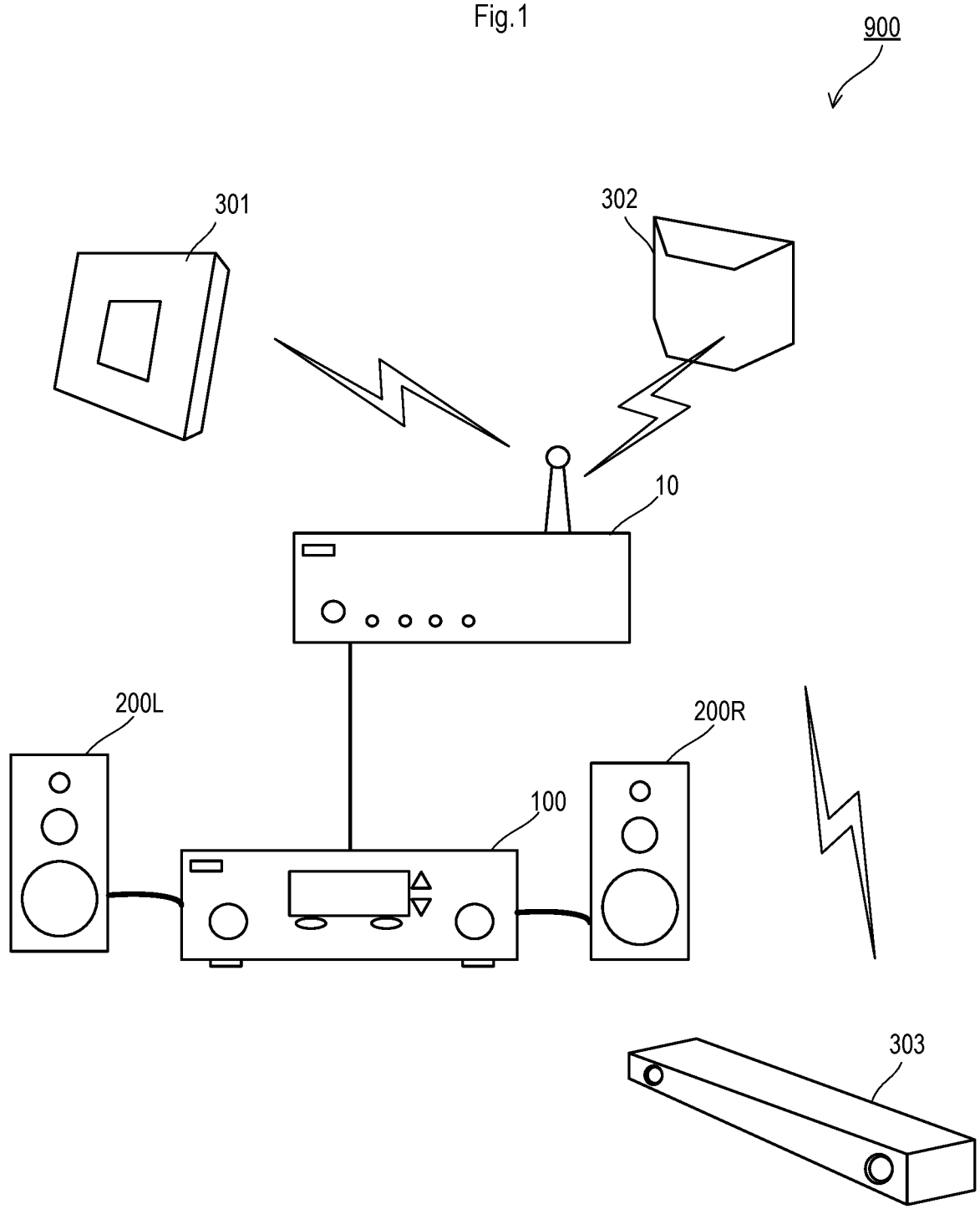
FIG. 1 is a diagram illustrating an overview of a content data delivery system.
Figure 2A:
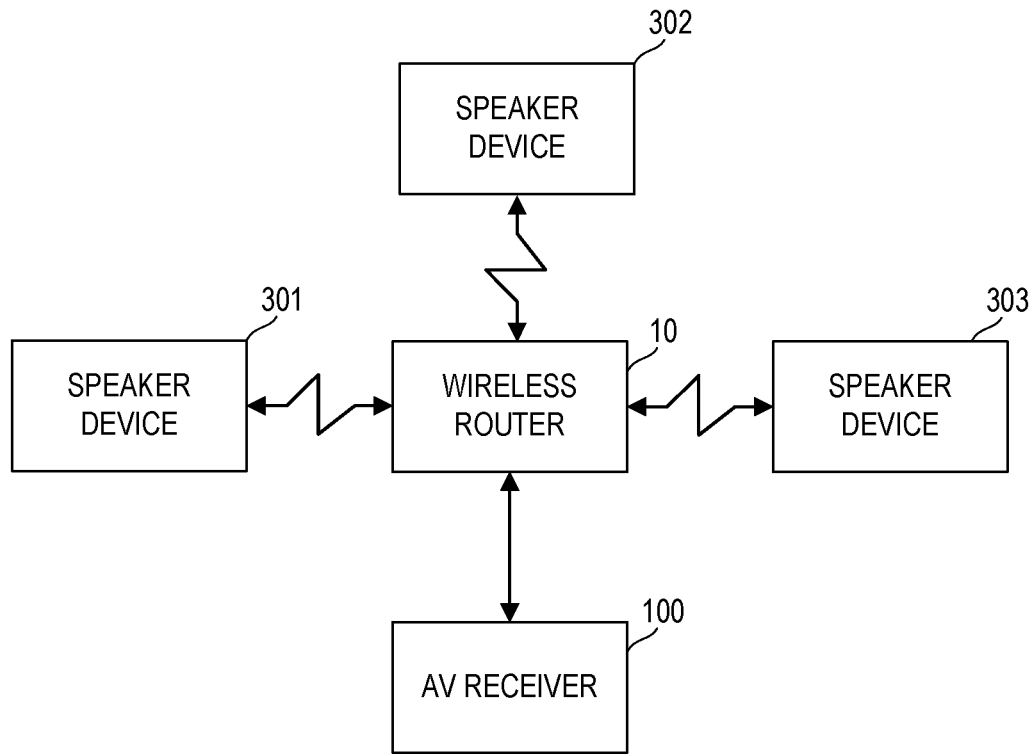
FIG. 2A is a diagram illustrating a connection relationship of each device.
Figure 2B:
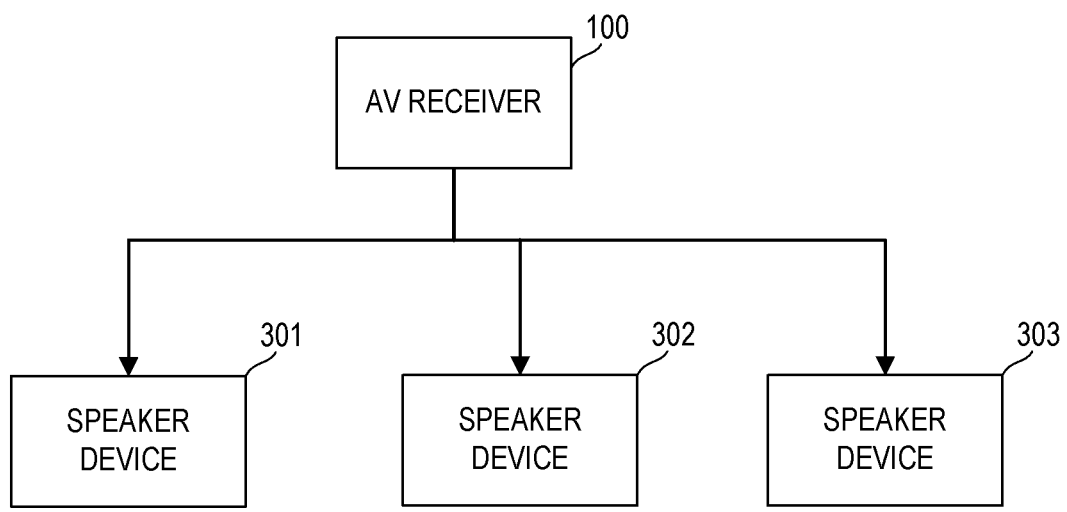
FIG. 2B is a block diagram illustrating a flow of data at a time of delivery of content data.

FIG. 1 is a diagram illustrating an overview of a content data delivery system 900. FIG. 2A is a diagram illustrating the connection relationship of each device. FIG. 2B is a block diagram illustrating a flow of data at a time of the delivery of content data.

As illustrated in FIG. 1, the content data delivery system 900 is provided with a wireless router 10, an AV receiver 100, a speaker device 301, a speaker device 302, and a speaker device 303. As illustrated in FIG. 2A, the AV receiver 100, the speaker device 301, the speaker device 302, and the speaker device 303 are network-connected to one another through the wireless router 10. In this example, the wireless router 10 and the AV receiver 100 are connected by a wired LAN, and the wireless router 10 and each speaker device are connected by a wireless LAN. However, the connection of each device may be wireless or may be wired, and, as long as a mode of the connection enables communication, the mode is not limited to the mode of connection through a network.

As illustrated in FIG. 2B, in the content data delivery system 900 of this example, the AV receiver 100 serves as a server, and delivers content data to the speaker device 301, the speaker device 302, and the speaker device 303 that each serve as a client. However, the wireless router 10 may serve as a server that delivers content data, and the AV receiver 100 may be a client. In addition, the wireless router 10 may serve as a server, and the AV receiver 100, the speaker device 301, the speaker device 302, and the speaker device 303 may each serve as a client. In addition, the speaker device 301 may serve as a server, and the speaker device 302 and the speaker device 303 may each serve as a client. In other words, in the content data delivery system, among network-connected devices, a predetermined device (a device specified by a user, for example) serves as a server and other devices each serve as a client.

The content data delivery system 900 streams the content data that is being reproduced in the AV receiver 100 to the speaker device 301, the speaker device 302, and the speaker device 303, and realizes synchronous reproduction in all the devices. Thus, a user listens to audio that is being reproduced by the AV receiver 100 in a living room, for example, and, then, in a case of moving to another room (a bedroom, for example), can also listen to the audio by the speaker device 301 installed in the bedroom.

Figure 3:
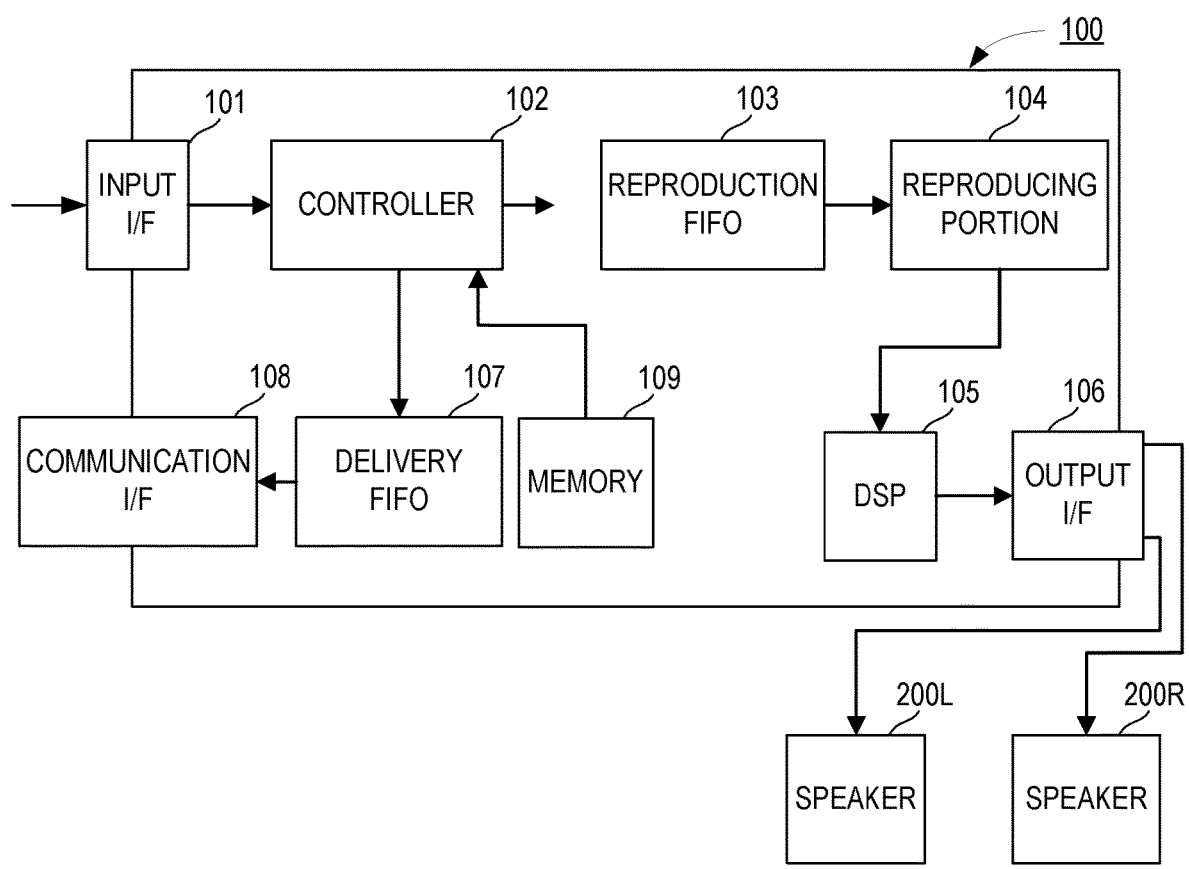
FIG. 3 is a block diagram illustrating a configuration of an AV receiver.

FIG. 3 is a block diagram illustrating a main configuration of the AV receiver 100. It is to be noted that, in this example, while the AV receiver 100 serves as a server, in a case in which other devices other than the AV receiver 100 serve as a server, the other devices are provided with the configuration as illustrated in FIG. 3.

The AV receiver 100 is provided with an input I/F (interface) 101, a controller 102, a reproduction FIFO 103, a reproducing portion (reproducer) 104, a DSP 105, an output I/F 106, a delivery FIFO 107, a communication I/F 108, and a memory 109. The controller 102 corresponds to a processor. The controller 102 reads a program (instructions) from the memory 109 and executes various tasks or steps.

The input I/F 101 includes an HDMI (registered trademark) terminal, a digital audio input terminal, or an analog audio input terminal, for example, and inputs content data, a digital audio signal, or an analog audio signal from the outside.

The content data is audio data encoded by MP3 and the like, for example. The input I/F 101 outputs input audio data to the controller 102. In addition, the input I/F 101, in a case in which an analog audio signal is input, converts the analog audio signal to a digital audio signal and outputs the digital audio signal to the controller 102.

It is to be noted that the content data may be input from a storage (NAS or the like, for example) of other devices through the communication I/F 108, may be input from an external server connected through the Internet, or may be input from an built-in storage such as an HDD.

The controller 102 corresponds to a delivering portion and a calculating portion of the present invention. The controller 102 converts the input audio data into the audio data as it is or audio data in a predetermined encoding method, and outputs the audio data to the reproduction FIFO 103 and the delivery FIFO 107 as packet data. In addition, the controller 102, also in a case in which a digital audio signal is input, converts the digital audio signal into audio data in a predetermined encoding method, and outputs the audio data to the reproduction FIFO 103 and the delivery FIFO 107 as packet data.

FIG. 5 illustrates an example of a packet data structure. The packet data as illustrated in FIG. 5 is composed of a header and a body (audio data). The header includes information (Command) that indicates a type of a packet, information (Sequence) that indicates the number of a packet, information (Clock) that indicates reproduction timing, and various types of information (Re_trans_id) that indicates whether or not the packet is retransmission data.

The Command may indicate that the packet is a packet of audio data and may indicate that the packet is a packet of other data (test data to be described below, for example). In a case of test data, the body is not audio data but, for example, text data.

The Sequence is used to determine whether or not a client has received packet data in a correct sequence. The client, in a case in which numbers included in the Sequence are discontinuous, determines that there is a loss of a packet and performs a retransmission request to a server.

The Clock is information that indicates reproduction timing (reproduction time) of audio data. The server and the client perform the reproduction of received audio data based on the reproduction time indicated by the Clock. As a result, synchronous reproduction is realized. However, the client, as will be described below, corrects the reproduction time by use of a clock difference.

The Re_trans_id includes information that indicates whether or not the packet is packet data to the retransmission request.

The controller 102 outputs the packet data as illustrated in FIG. 5 to the reproduction FIFO 103 and the delivery FIFO 107.

The reproduction FIFO 103 and the delivery FIFO 107 each are a temporary storage that holds packet data of a predetermined time and outputs the packet data in an input sequence. The reproduction FIFO 103 and the delivery FIFO 107 have a capacity that is set in consideration of time (a processing delay) required for processing of various processors provided in a subsequent stage. For example, the reproduction FIFO 103, if the processing time of the reproducing portion 104 is 0.1 seconds, the processing time of the DSP 105 is 0.1 seconds, and the time required for delivering packet data is 1.8 seconds, has a capacity that is set to be equivalent to audio data of about 2 seconds. The delivery FIFO 107 has a capacity that is set to be equivalent to audio data of about 0.2 seconds obtained by excluding the time required for delivery.

As a result, the reproduction timing of the AV receiver 100 being a server matches the reproduction timing of the audio data in each speaker device being a client. Therefore, the content data delivery system 900 is able to realize synchronous reproduction.

The packet data held in the reproduction FIFO 103 is output to the reproducing portion 104. The reproducing portion 104, based on the reproduction time included in the packet data, reproduces the audio data of the packet data and outputs a digital audio signal.

The digital audio signal that has been reproduced by the reproducing portion 104 is subjected to predetermined signal processing (processing of adding a sound field effect by adding a pseudo reflected sound, for example) by the DSP 105 being a server side signal processor, and is output to the output I/F 106.

The digital audio signal that has been output from the output I/F 106 is input to a speaker 200L and a speaker 200R. The speaker 200L and the speaker 200R convert the input digital audio signal into an analog audio signal and amplify the analog audio signal. The speaker 200L and the speaker 200R input an amplified analog audio signal to an own speaker unit. As a result, the speaker 200L and the speaker 200R output sound according to audio data. It is to be noted that the output I/F 106 and each speaker may be connected through a speaker cable (an analog audio line). In such a case, a DAC and an amplifying portion are arranged between the DSP 105 and the output I/F 106.

On the other hand, the packet data to be output from the delivery FIFO 107 is delivered to the speaker device 301, the speaker device 302, and the speaker device 303 through the communication I/F 108 being a server side communication portion.

Figure 4:
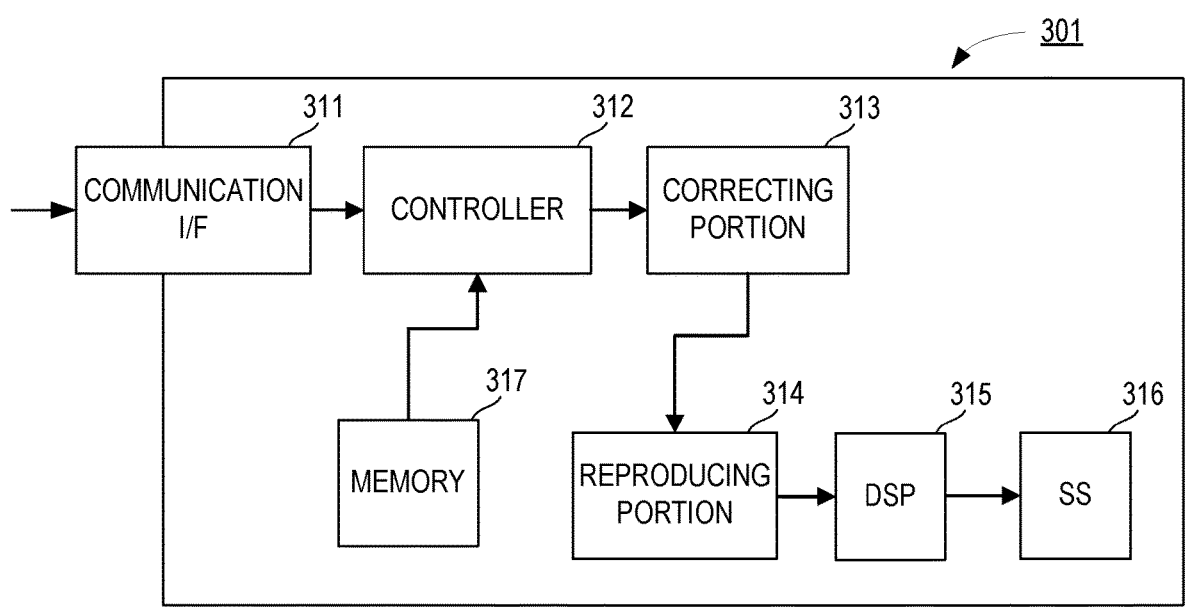
FIG. 4 is a block diagram illustrating a configuration of a speaker device.

FIG. 4 is a block diagram illustrating a main configuration of the speaker device 301. Since the main configurations of other speaker device 302 and speaker device 303 are also similar, FIG. 4 illustrates the configuration of the speaker device 301 as a representative.

The speaker device 301 is provided with a communication I/F 311, a controller 312, a correcting portion 313, a reproducing portion 314, a DSP 315, an SS (a sound system) 316, and a memory 317. The controller 312 corresponds to a processor. The controller 312 reads a program (instructions) stored in the memory 317 and executes various tasks or steps.

The communication I/F 311 receives packet data delivered from the AV receiver 100 being a server, and inputs the packet data to the controller 312. The controller 312 determines whether or not the packet data is received in the correct sequence. As described above, the packet data includes information (Sequence) that indicates a sequence. Therefore, the controller 312, in a case in which the numbers included in the Sequence are continuous, outputs received packet data to the correcting portion 313 provided in a subsequent stage. The controller 312, in a case in which the numbers included in the Sequence are discontinuous, determines that there is a loss of a packet and performs a retransmission request to the AV receiver 100. The controller 312 holds received new packet data in a built-in buffer until the packet data in the correct sequence is retransmitted.

The correcting portion 313 corrects the reproduction time included in the received packet data. As described above, the content data delivery system 900 of the present embodiment is able to realize synchronous reproduction by the information that indicates the reproduction time included in the packet data, the delivery FIFO 107, and the reproduction FIFO 103. However, since each device has a different absolute value of a clock and a different rate of advance of a clock, if each device continues reproduction for a long time (about 5 minutes, for example), out-of-sync sound between devices causes a problem. Therefore, the content data delivery system 900 transmits and receives test data between the server and the client and calculates a clock difference. The correcting portion 313 corrects a reproduction time by use of the clock difference.

Figure 6:
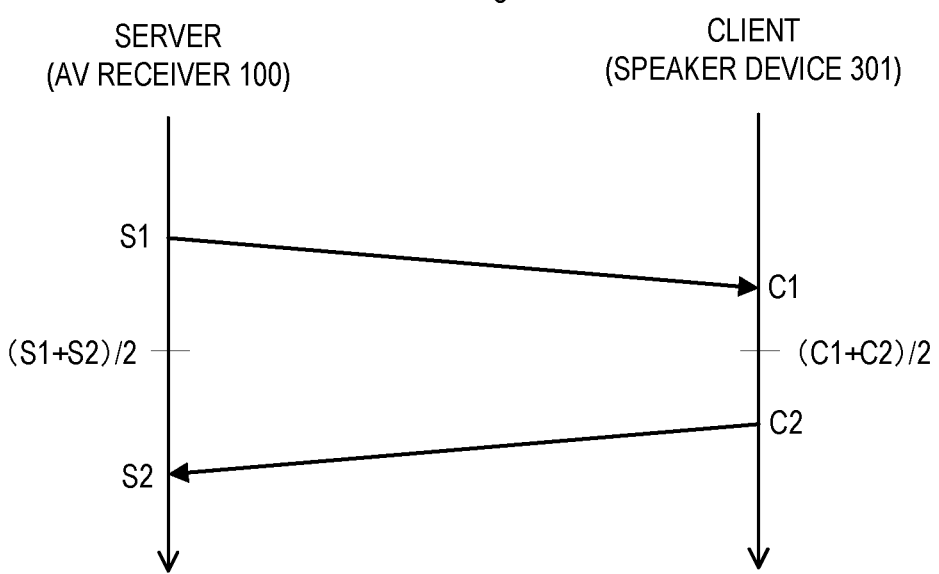
FIG. 6 is a conceptual diagram illustrating transmission and reception of test data.
Figure 7:
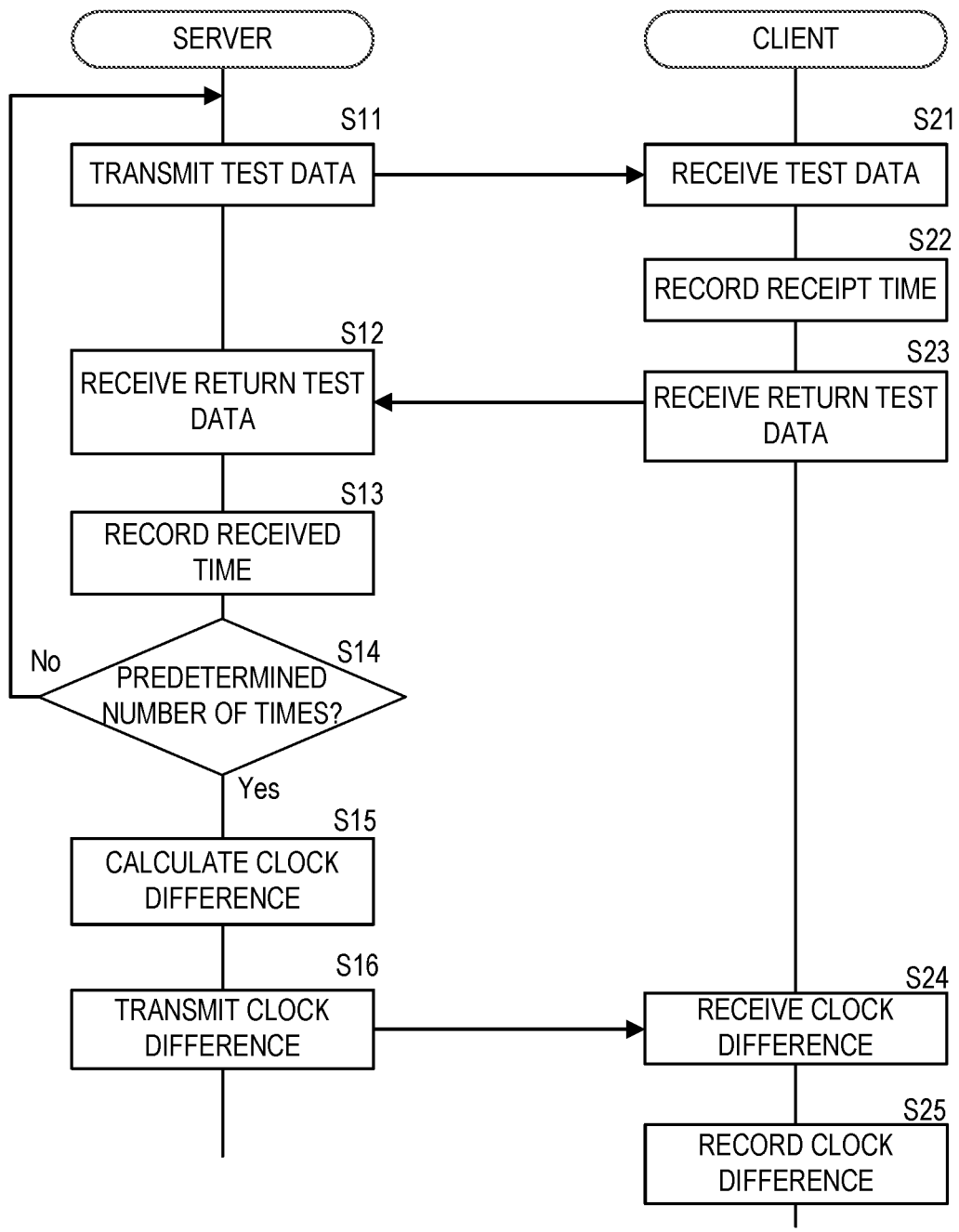
FIG. 7 is a flow chart showing an operation at a time of transmission and reception of test data.

FIG. 6 is a conceptual diagram illustrating transmission and reception of test data. FIG. 7 is a flowchart showing an operation of the content data delivery system 900 at the time of transmission and reception of test data. The vertical direction of FIG. 6 indicates time direction, and time elapses toward the bottom.

To begin with, the AV receiver 100 being a server transmits test data (packet data) including transmission time S1 to the speaker device 301 being a client (S11).

The speaker device 301 receives the test data that has been transmitted from the AV receiver 100 (S21), and adds time C1 when the test data is received to the test data (S22). Further, the speaker device 301 adds transmission time C2 to the test data, and transmits the test data to the AV receiver 100 as return test data (S23).

The AV receiver 100 receives the return test data from the speaker device 301 (S12), and records time S2 when the return test data is received (S13). Then, the AV receiver 100 determines whether or not the number of times of transmission and reception of the test data reaches the predetermined number of times (S14).

It is to be noted that the time S1 and the time S2 are based on the clock of the AV receiver 100, and the time C1 and the time C2 are based on the clock of the speaker device 301.

The transmission and reception of the test data may be performed only once, but preferably a plurality of times. Ina case in which test data is transmitted a plurality of times, the AV receiver 100 adopts a value with the smallest time difference between the transmission time S1 of the test data and the reception time S2 of the return test data, and uses the most reliable result.

Then, the AV receiver 100 obtains a difference (a reference time difference between the server and the client)

between the clock of the AV receiver 100 and the clock of the speaker device 301 (S15). A clock difference is obtained, for example, as follows.

The AV receiver 100 calculates the arithmetic average (S1+S2)/2 of the transmission time S1 of test data and the reception time S2 of return test data. In addition, the AV receiver 100 calculates the arithmetic average (C1+C2)/2 of the reception time C1 of the test data and the transmission time C2 of return test data in the speaker device 301. These values of the arithmetic average are the same values if the absolute values of the clocks of the AV receiver 100 and the speaker device 301 are the same. Therefore, the AV receiver 100 calculates the clock difference (the reference time difference of the server and the client) with the clock on the side of the AV receiver as a reference, as the difference (S1+S2)/2−(C1+C2)/2 in arithmetic average.

The AV receiver 100 performs the above transmission and reception of the test data to each speaker device and obtains a clock difference for each speaker device.

The calculated clock difference is transmitted to the correcting portion 313 of each speaker device (S16). The speaker device 301 receives the clock difference that has been calculated by the AV receiver 100 (S24), and records the clock difference in a built-in memory (not shown) of the correcting portion 313 (S25). The correcting portion 313 corrects a reproduction time by use of the clock difference that has been transmitted from the AV receiver 100.

Figure 8:
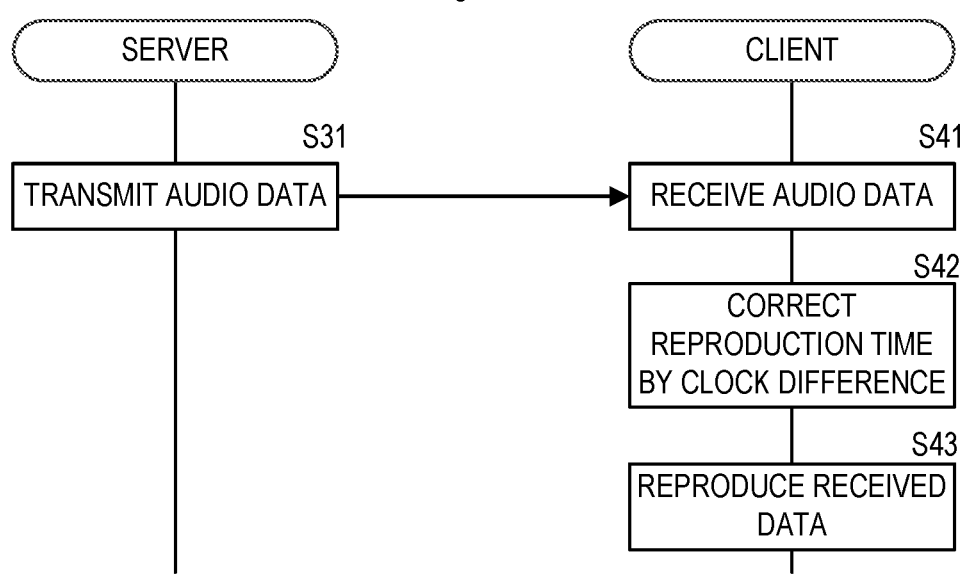
FIG. 8 is a flow chart showing an operation at a time of delivery.

With reference to the flow chart of FIG. 8, a description will be made of an operation at the time of delivery. As illustrated in the flow chart of FIG. 8, the AV receiver 100 streams audio data as the packet data as illustrated in FIG. 5 (S31), the speaker device 301 receives the packet data (S41). The correcting portion 313 of the speaker device 301 reads the reproduction time (Clock as illustrated in FIG. 5) included in the received packet data, and corrects the reproduction time by use of the clock difference recorded in the processing of S25 (S42). The clock difference is a value obtained by subtracting the clock on the client side from the clock on the server side, and the reproduction time included in the delivered packet data is a time on the basis of the clock of the AV receiver 100. Therefore, the correcting portion 313 changes the reproduction time by subtracting the value of the clock difference from the reproduction time included in the delivered packet data. The correcting portion 313 outputs the packet data including a corrected reproduction time to the reproducing portion 104 provided in a subsequent stage. The reproducing portion 104, based on the reproduction time of input packet data, reproduces the audio data of the packet data and outputs a digital audio signal (S43).

The digital audio signal that has been reproduced by the reproducing portion 104 is subjected to predetermined signal processing (processing of adding a sound field effect by adding a pseudo reflected sound, for example) by the DSP 315 being a client side signal processor, and is output to the SS 316. The SS 316 is provided with a DAC, an amplifying portion, and a speaker unit. As a result, the sound according to the audio data delivered by the AV receiver 100 is output from the speaker unit of the speaker device 301, and synchronous reproduction is thus realized.

It is to be noted that, while the above described example illustrates an example in which transmission and reception of test data are performed before the delivery of audio data, the transmission and reception of test data may also be performed during the delivery of audio data. In such a case, the AV receiver 100 performs transmission and reception once or a plurality of times at every lapse of a predetermined time, and calculates a clock difference with each speaker device. In the case in which test data is transmitted a plurality of times, in the same manner as described above, a value with the smallest time difference between the transmission time S1 of the test data and the reception time S2 of the return test data is adopted. The AV receiver 100 transmits a calculated clock difference to each speaker device at every lapse of a predetermined time. The correcting portion 313 of each speaker device corrects the reproduction time among clock differences received from the AV receiver 100, by use of the latest clock difference. In such a case, synchronous reproduction is able to be performed with higher accuracy.

Figure 9:
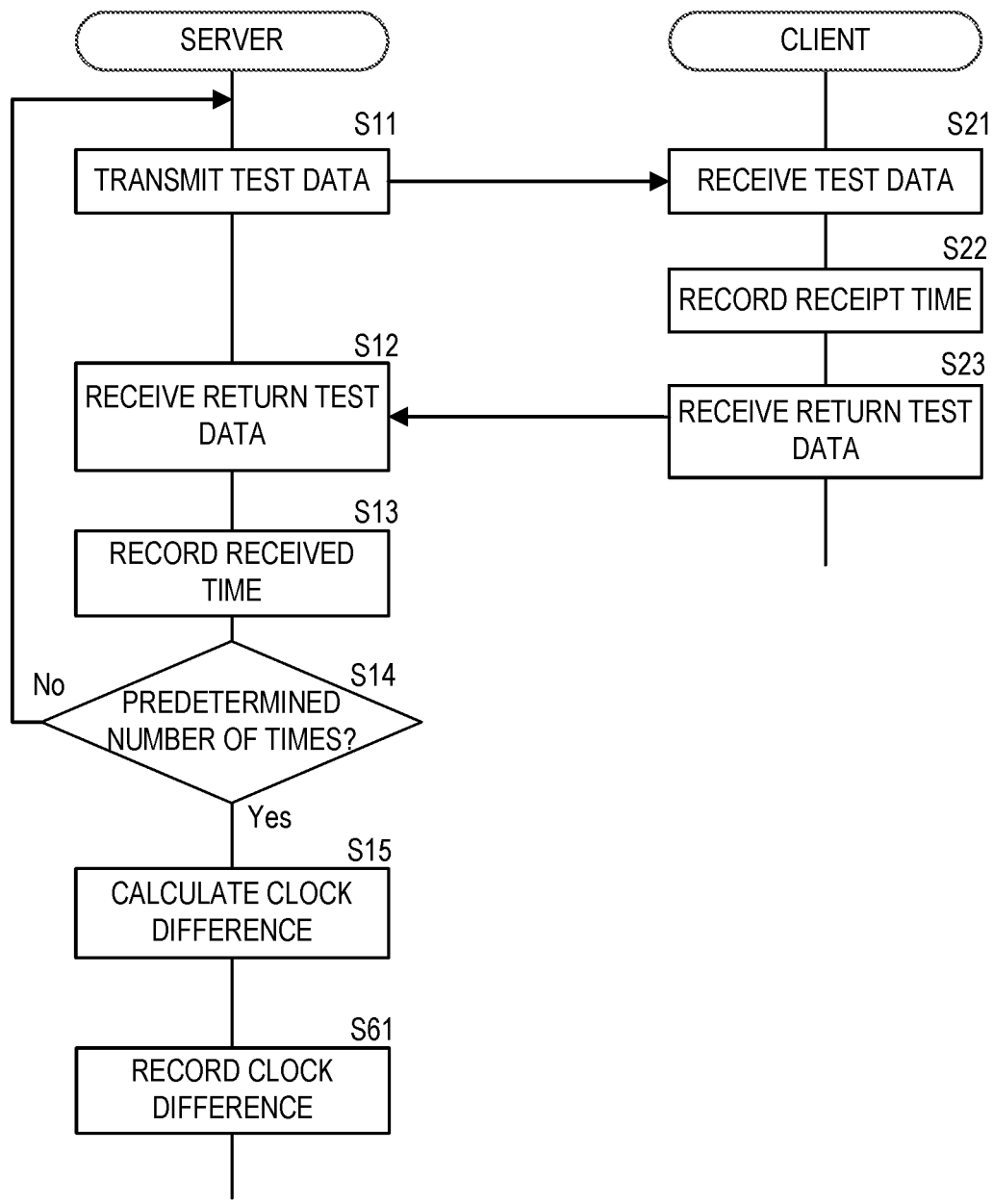
FIG. 9 is a flow chart showing an operation at the time of transmission and reception of test data.
Figure 10:
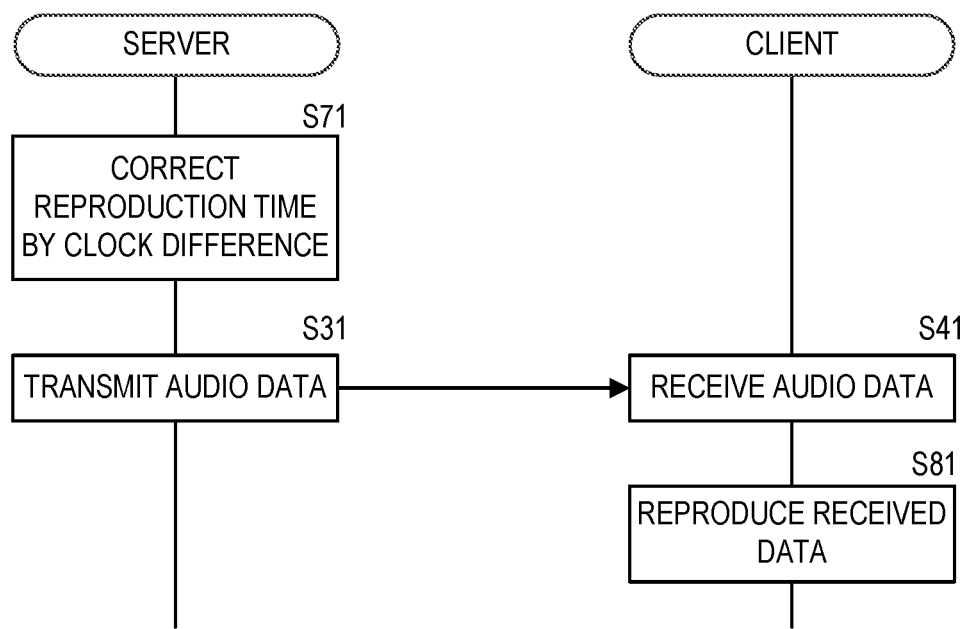
FIG. 10 is a flow chart showing an operation at the time of delivery.

Subsequently, FIG. 9 is a flow chart showing an operation of the content data delivery system 900 at the time of transmission and reception of test data according to a first modification. FIG. 10 is a flow chart showing an operation at the time of delivery according to the first modification. In FIG. 9, like reference numerals are used to refer to processing common to the processing shown in FIG. 7, and the description is omitted. In addition, in FIG. 10, like reference numerals are used to refer to an operation common to the operation shown in FIG. 8, and the description is omitted.

In the content data delivery system 900 according to the first modification, the AV receiver 100 records a calculated clock difference in a built-in memory (not shown) of the AV receiver 100 (S61). Then, the controller 102 of the AV receiver 100 corrects a reproduction time of packet data to deliver, by use of a clock difference with each speaker device (S71). Each speaker device reproduces received packet data according to the reproduction time of the received packet data (S81).

Therefore, in this example, the configuration of the correcting portion 313 becomes unnecessary in each speaker device, and each piece of packet data to be delivered to each speaker device is different in reproduction time. Also in this case, synchronous reproduction is able to be realized.

Figure 11:
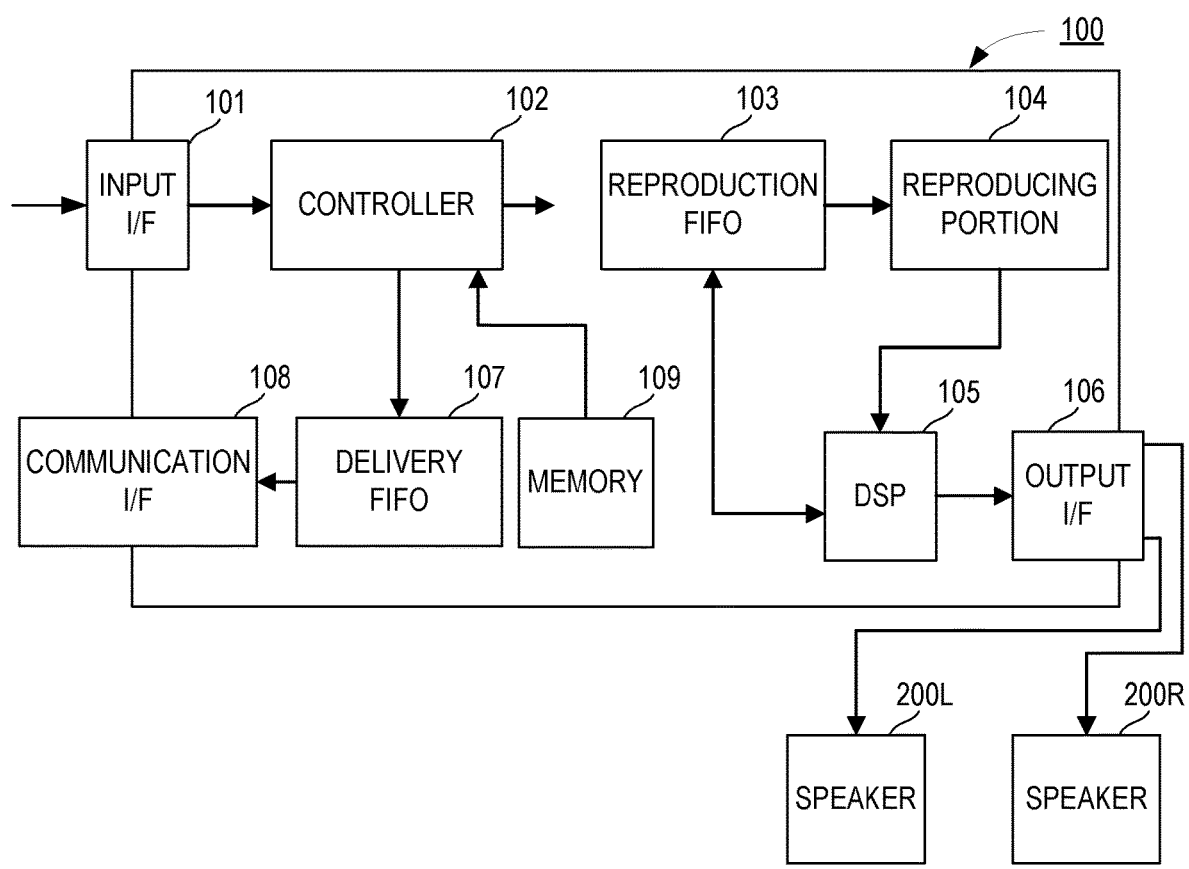
FIG. 11 is a block diagram illustrating a configuration of an AV receiver.

Subsequently, a description will be made of a content data delivery system 900 according to a second modification. As illustrated in FIG. 11, in the content data delivery system 900 according to the second modification, the configuration of the AV receiver 100 is the same as the configuration of the example illustrated in FIG. 3. However, in the second modification, the capacity of the reproduction FIFO 103 is set according to the processing time of the DSP 105.

In the example illustrated in FIG. 3, the reproduction FIFO 103 has a capacity that is set to be equivalent to the audio data of 2 seconds. In other words, under the assumption that the processing time of the DSP 105 of an own device and the DSP of other speaker devices is 0.1 seconds, the capacity of the reproduction FIFO 103 is set. However, the processing time of the DSP 105 greatly changes with details of processing. For example, the details of the signal processing of the DSP 105 are simple (in a case of omitting processing of adding a sound field effect, for example), the processing time may be shorter.

Thus, in the second modification illustrated in FIG. 11, the capacity of the reproduction FIFO 103 is set according to the processing time of the DSP 105. For example, in a case in which the processing time of the DSP 105 is 0.05 seconds, the capacity that is equivalent to audio data of 1.95 seconds is set to the reproduction FIFO 103.

Figure 12:
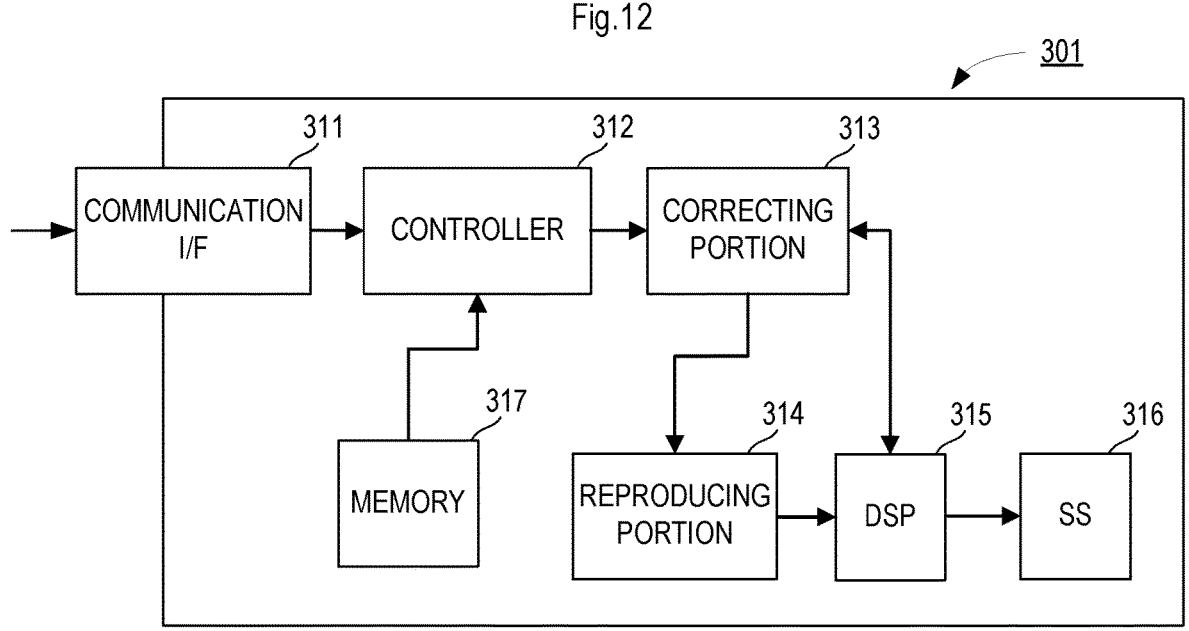
FIG. 12 is a block diagram illustrating a configuration of a speaker device.

Subsequently, a description will be made of a content data delivery system 900 according to a third modification. As illustrated in FIG. 12, in the content data delivery system 900 according to the third modification, the configuration of the speaker device 301 is the same as the configuration of the example illustrated in FIG. 4. However, in the third modification, the correcting portion 313 adjusts reproduction timing according to the processing time of the DSP 315.

In other words, the correcting portion 313 corrects the reproduction time of packet data by a clock difference and further performs processing of moving the reproduction time forward by the processing time of the DSP 315. For example, in a case in which the processing time of the DSP 315 is 0.05 seconds, the correcting portion 313 performs processing of rewriting the reproduction time of packet data to a value obtained by moving the reproduction time forward by 0.05 seconds. As a result, even when the processing time of the DSP is different in each device, sound emission timing in each device matches, and thus highly accurate synchronous reproduction is able to be realized.

It is to be noted that, while, in this example, the correcting portion 313 functions as an adjusting portion that adjusts reproduction timing, the reproducing portion 314 may function as an adjusting portion that adjusts reproduction timing or the controller 312 may function as an adjusting portion that changes the reproduction time of packet data.

Figure 13:
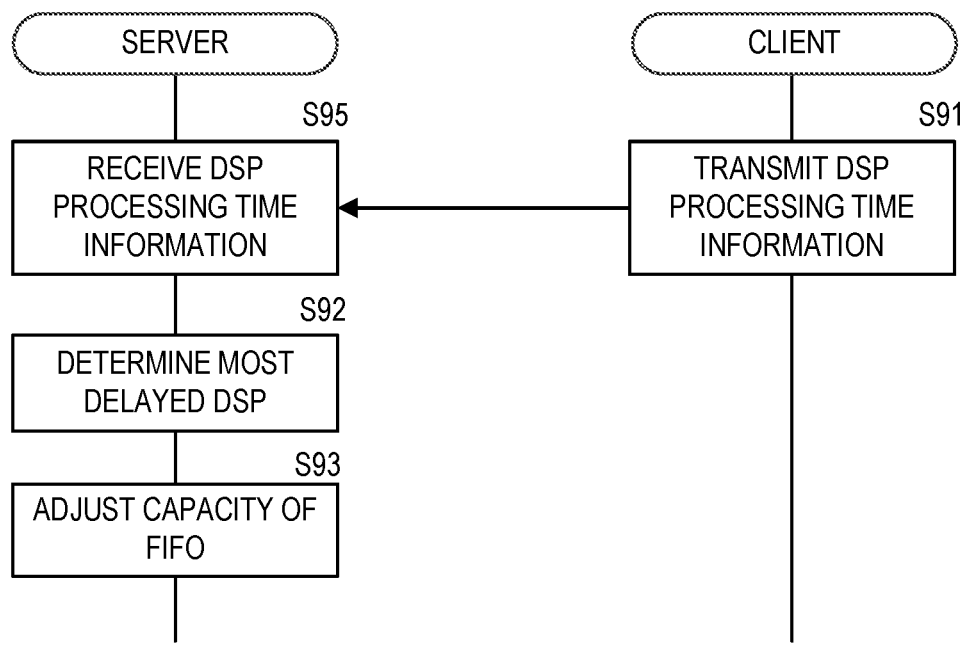
FIG. 13 is a flow chart showing an operation in a case in which a capacity of an FIFO is adjusted.

Subsequently, a description will be made of an operation of a content data delivery system 900 according to a fourth modification with reference to a flow chart as illustrated in FIG. 13. The content data delivery system 900 according to the fourth modification sets the capacity of the reproduction FIFO 103 and the delivery FIFO 107 according to the processing time of a DSP with the longest processing time.

Each speaker device transmits information that indicates the processing time of the DSP 315 of the own device, to the AV receiver 100 (S91). The AV receiver 100 receives the information that indicates the processing time from each speaker device (S95), and determines a DSP with the longest processing time (S92). Then, the AV receiver 100 sets the capacity of the reproduction FIFO 103 and the delivery FIFO 107 corresponding to the DSP with the longest processing time (S93).

For example, in a case in which the processing time of the DSP 105 of the AV receiver 100 is 0.05 seconds, the processing time of the speaker device 301 is 0.02 seconds, the processing time of the speaker device 302 is 0.05 seconds, the processing time of the speaker device 303 is 0.08 seconds, the time required for delivery is 1.8 seconds, and the processing time of the reproducing portion of each device is 0.1 seconds, the delivery FIFO 107 has a capacity that is set to be equivalent to audio data of 0.18 seconds obtained by excluding the time required for delivery. While the capacity that is equivalent to audio data of 1.98 seconds in consideration of the time (1.8 seconds) required for delivery is set to the reproduction FIFO 103, in consideration of 0.05 seconds that is the processing time of the DSP 105 in practice, the capacity that is equivalent to audio data of 1.93 seconds is set.

Then, in each speaker device, processing of moving the reproduction time forward by the processing time of each DSP is performed. For example, in the speaker device 301, since the processing time of the DSP is 0.02 seconds, in the correcting portion 313, processing of moving the reproduction time of packet data forward by 0.02 seconds is performed. In the speaker device 302, since the processing time of the DSP is 0.05 seconds, in the correcting portion 313, processing of moving the reproduction time of packet data forward by 0.05 seconds is performed. In the speaker device 303, since the processing time of the DSP is 0.08 seconds, in the correcting portion 313, processing of moving the reproduction time of packet data forward by 0.08 seconds is performed.

As a result, the capacity of the reproduction FIFO 103 and the delivery FIFO 107 is set to an optimal value (the smallest capacity) in consideration of the processing delay of each processor. Therefore, extra delay time to a reproduction start is minimized.

The foregoing preferred embodiments are illustrative in all points and should not be construed to limit the present invention. The scope of the present invention is defined not by the foregoing preferred embodiment but by the following claims. Further, the scope of the present invention is intended to include all modifications within the scopes of the claims and within the meanings and scopes of equivalents.

What is claimed is:

1. A content data delivery system, comprising:
a plurality of clients which respectively comprising at least one processor configured to implement stored instructions;
a server comprising at least one processor configured to implement stored instructions and to execute a plurality of tasks, the plurality of tasks comprising:
a server side communication task that transmits test data including transmission time information to the plurality of clients and receives return test data from the plurality of clients including reception time information of the test data and transmission time information of the return test data;
a calculating task that obtains a reference time difference with the plurality of clients based on the test data that has been transmitted and received by the server side communication task by calculating:
a server arithmetic average of the transmission time of the test data and the reception time of the return test data;
a client arithmetic average of the reception time information of the test data and the transmission time information of the return test data; and
a difference between the server arithmetic average and the client arithmetic average as the reference time difference; and
a delivering task that delivers content data including information that indicates reproduction timing, to plurality of clients, wherein
the processor of the server or the processor of each of the plurality of clients executes a correcting task that corrects the reproduction timing of the content data by use of the reference time difference,
when obtaining the reference time difference for one of the plurality of clients, transmission of the test data and reception of the return test data are executed a plurality of times between the server and the one of the plurality of clients, and
the calculating task calculates the reference time difference for the one of the plurality of clients by use of the transmission time and the reception time such having a smallest difference in time from the transmission of the test data to the reception of the return test data.

2. The content data delivery system according to claim 1, wherein
the correcting task is executed by the processor of the server and corrects the reproduction timing of the content data to be delivered to the client by use of the reference time difference.

3. The content data delivery system according to claim 1, wherein:

the correcting task is executed by the processor of the client;

the delivering task delivers the reference time difference to the client; and the correcting task corrects the reproduction timing of the content data by use of the reference time difference that has been received from the server.

4. The content data delivery system according to claim 1, wherein:

transmission and reception of data including the time information is performed during delivery of the content data; and the calculating task obtains the reference time difference by use of a latest test data.

5. The content data delivery system according to claim 1, wherein the server comprises a temporary storage that has a capacity corresponding to time required for delivery of the content data to the client.

6. The content data delivery system according to claim 5, wherein:

the server comprises:
a server side reproducer that reproduces the content data; and
a server side signal processor that performs predetermined processing to a signal according to the content data that has been reproduced by the server side reproducer; and the capacity of the temporary storage is adjusted based on processing time of the server side signal processor.

7. The content data delivery system according to claim 1, wherein:

the client comprises:
a client side reproducer that reproduces the content data; and
a client side signal processor that performs predetermined processing to a signal according to the content data that has been reproduced by the client side reproducer and the processor of the client executes an adjusting task that adjusts the reproduction timing of the content data based on processing time of the client side signal processor.

8. The content data delivery system according to claim 6, wherein:

the client comprises:
a client side reproducer that reproduces the content data; and
a client side signal processor that performs predetermined processing to a signal according to the content data that has been reproduced by the client side reproducer;

the processor of the client executes a client side communication task that transmits information that indicates the processing time of the client side signal processor, to the server; and the capacity of the temporary storage is adjusted based on the processing time of the server side signal processor and the processing time of the client side signal processor.

9. A content data delivery method, comprising:

a server side communication step of transmitting test data including transmission time information to a plurality of clients and receiving return test data from the plurality of clients including reception time information of the test data and transmission time information of the return test data;

a calculation step of obtaining a reference time difference with the plurality of clients based on each piece of the test data that has been transmitted and received in the server side communication step by calculating:
a server arithmetic average of the transmission time of the test data and the reception time of the return test data;
a client arithmetic average of the reception time information of the test data and the transmission time information of the return test data for the plurality of clients; and
a difference between the server arithmetic average and the client arithmetic average as the reference time difference;

a delivery step of delivering content data including information that indicates reproduction timing, to the plurality of clients; and a correction step of correcting the reproduction timing of the content data by use of the reference time difference, wherein when obtaining the reference time difference for one of the plurality of clients, transmission of the test data and reception of the return test data are executed a plurality of times with the one of the plurality of clients, and the calculation step calculates the reference time difference for one of the plurality of clients by use of the transmission time and the reception time such having a smallest difference in time from the transmission of the test data to the reception of the return test data.

10. The content data delivery method according to claim 9, wherein the correction step is executed by the server and corrects the reproduction timing of the content data to be delivered to the plurality of clients by use of the reference time difference.

11. The content data delivery method according to claim 9, wherein:

the correction step is executed by the plurality of clients;
the delivery step delivers the reference time difference to the plurality of clients; and
the correction step corrects the reproduction timing of the content data by use of the reference time difference that has been received from the server.

12. The content data delivery method according to claim 9, wherein:

transmission and reception of data including the time information is performed during delivery of the content data; and
the calculation step obtains the reference time difference by use of a latest test data.

13. The content data delivery method according to claim 9, wherein the server comprises a temporary storage that has a capacity corresponding to time required for delivery of the content data to the plurality of clients.

14. The content data delivery method according to claim 13, wherein:

the server executes:
a server side reproducing step of reproducing the content data; and
a server side signal processing step of performing predetermined processing to a signal according to the content data that has been reproduced by the server side reproducing step; and the capacity of the temporary storage is adjusted based on processing time of the server side signal processing step.

15. The content data delivery method according to claim 9, wherein:
   the plurality of clients execute:
      a client side reproducing step of reproducing the content data; and
      a client side signal processing step of performing predetermined processing to a signal according to the content data that has been reproduced by the client side reproducing step; and
   the plurality of clients adjust the reproduction timing of the content data based on processing time of the client side signal processing step.

16. The content data delivery system according to claim 1, wherein
   the content data and reproduction timing are delivered together during a same transmission.

* * * * *